United States Patent [19] | [11] 4,134,504
Salas et al. | [45] Jan. 16, 1979

[54] LIFT FOR WHEELCHAIRS

[76] Inventors: Louis Salas; Philip M. Salzman, both of 3519 Ryder St., Santa Clara, Calif. 95051

[21] Appl. No.: 725,166

[22] Filed: Sep. 21, 1976

[51] Int. Cl.[2] .................... B60P 1/44

[52] U.S. Cl. .................... 214/77 R; 214/83.24; 214/146.5; 214/DIG. 13

[58] Field of Search .................... 214/75 T, 77 R, 77 P, 214/83.24, DIG. 10, 146.5, 750, 730, DIG. 13; 224/42.44

[56] References Cited

U.S. PATENT DOCUMENTS

| | | | |
|---|---|---|---|
| 1,422,432 | 7/1922 | Forbes | 214/83.24 |
| 3,357,582 | 12/1967 | Wittek | 214/730 X |
| 3,599,810 | 8/1971 | Wanko | 214/77 R |
| 3,638,813 | 2/1972 | Strong | 214/77 R X |
| 3,837,508 | 9/1974 | Stefanelli | 214/77 P X |
| 3,893,697 | 7/1975 | Blitz et al. | 214/77 R X |
| 3,913,759 | 10/1975 | Deacon | 214/77 R |
| 4,058,228 | 11/1977 | Hall | 214/77 R |

FOREIGN PATENT DOCUMENTS

| | | | |
|---|---|---|---|
| 2246821 | 3/1974 | Fed. Rep. of Germany | 214/77 P |

OTHER PUBLICATIONS

Para Industries Advertisement (models 100 and 200), Calgary, Alberta.

*Primary Examiner*—L. J. Paperner
*Attorney, Agent, or Firm*—Julian Caplan

[57] ABSTRACT

The lift is installed on the underside of the body of a van below the side doors. In retracted position it is entirely concealed below the van and does not obstruct normal usage of the van. Stationary portions of the device are fixed to the van frame. Slideable therein are an outer platform and a support frame for the outer platform is extended by a first hydraulic cylinder and linkage. Slideable relative to the outer platform is an inner platform. The inner platform extends and retracts with the outer platform by means of a cable drive. A pair of second hydraulic cylinders interconnect the outer platform and the support frame using four links which raise and lower both platforms in a parallelogram linkage. Thus the platforms remain substantially horizontal as they move from a first position directly horizontally outward from their storage position to a lower position and then upward to an upper position, then back to first position, whereupon, the platforms and the support frame may be returned to retracted position. Thus in lower position the inner platform is at street or curb level so that a wheelchair may be rolled onto the platforms. As the platforms rise to upper position, the wheelchair is lifted to the level of the floor of the van and the platforms move inward to contact the van floor so that the wheelchair may be rolled into the van.

6 Claims, 13 Drawing Figures

LIFT FOR WHEELCHAIRS

This invention relates to a new and improved lift for wheelchairs whereby a wheelchair or other load (hereinafter referred to as "wheelchair" for convenience) may be raised from the ground to an elevated height level with the floor of a van or other vehicle. Heretofore, raising a wheelchair into a vehicle has been a difficult problem; and although there are lifts in existence, these mechanisms have considerable disadvantages which are overcome by the present invention.

A feature of the invention is the fact that the mechanism is retracted between uses into a position beneath the vehicle door so that it does not present an obstruction to the door nor project outside the contours of the vehicle.

A principle feature of the present invention is the fact that it is a "passive" lift in that the doorway of the vehicle is useable in normal fashion between uses to lift a wheelchair. Heretofore, most lifts of this general type have required that the doorway be "dedicated" to the use of a lift in that the doorway is not useable except for lift purposes. Because the device of the present invention has a storage position completely concealed under the vehicle and not in anyway interfering with normal usage of the vehicle, considerable versatility in use of the van is accomplished.

At the same time, no part of the lift is within the van body between uses. This means that there are no protrusions on the interior of the van which may be dangerous to personnel.

Another feature of the invention is the fact that there is only a minimum of modification of the van required and no welding of the lift structure to the original equipment.

Still a further feature of the invention is the telescoping of the parts of the lift which extend out from the van during use into a short space all on one side of the longitudinal drive shaft of the van. A linkage, hereinafter described in detail, permits a rather full extension of the lift accomplished by the stroke of a hydraulic cylinder having a relatively short amplitude.

Still another feature of the invention is the fact that there are two telescoping platforms or pans which carry the wheelchair. The upper or outboardmost pan is projected at twice the rate of the lower or inboardmost pan by a single cylinder. On loading the wheelchair, the chair is first rolled onto the outboardmost platform and then onto the inboardmost platform which is slightly below the level of the outboardmost platform. From the inboardmost platform the wheelchair is rolled onto the floor of the van. In unloading the wheelchair, the reverse operation is performed.

Another feature of the invention is the fact that in projected position the outboardmost platform may be at a slight angle relative to the inboardmost platform and this provides a stop or barrier which limits outward movement of the wheelchair and prevents the chair from unintentionally being dropped from the lift.

A still further feature of the invention is the means whereby the two platforms may be raised from ground level to the level of the floor of the van and then returned to ground level on unloading. In order to move the mechanism to storage position, the pans are positioned at an intermediate level between raised and lowered position.

Another feature of the lift is that the geometry of the lift arms is such that the lift travels through a gentle arc throughout its lift travel that is so designed as to clear the doorsill (and lower step) and yet match the floor edge inside the van (without van modification) as well as contact the sidewalk or street (etc.) reasonably near the vehicle so that the van does not roll excessively from the overhung load.

An important feature of the invention is the parallelogram linkage which raises and lowers the pans. Such linkage is quite stiff and resists lateral movement. Hence the lift is safe and stable.

An important feature of the lift is that it is assembled into a single compact package that can be quickly and simply installed by bolting it in place. The unit mounts to the bottom of the vehicle; the only modification of which is bolt holes.

Other objects of the present invention will become apparent upon reading the following specification and referring to the accompanying drawings in which similar characters of reference represent corresponding parts in each of the several views.

Figure 1:
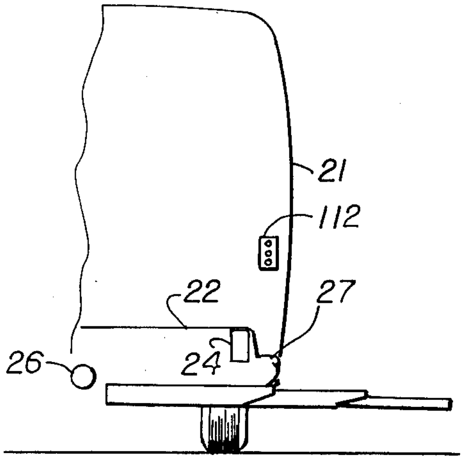
FIG. 1 is a schematic view showing the device installed on a van with the mechanism in a position directly projected from storage position.

The lift of the present invention is intended for use with a van 21. One such van is shown schematically in the accompanying drawings, it being understood that commercially available vans differ in details of construction. One advantage of the invention is the fact that it may be attached to a variety of different commercially available vans with a minimum of alteration of the van and no welding of parts required. In a preferred installation, the device is attached below the level of the body of the van 21 immediately beneath the side doors. However, the device may be installed in other locations. The floors 22 of different vans may be at different levels from the ground. In most constructions, to accommodate swinging or sliding of the side doors there is a ledge at a lower elevation than floor 22 projecting out to the side of the van. Frame members 24, not shown in detail because there are so many different constructions which are in existence, exist below the floor 22 and the device is bolted or otherwise permanently attached to such frame members 24. It will be noted particularly with respect to FIGS. 1 and 2 that the device is entirely on one side of the longitudinal drive shaft 26 of the vehicle, that it is spaced well above the ground and that in retracted position it is entirely within the contour of the body of the van 21 and does not project outwardly thereof when fully retracted. Additionally, the mechanism is stored below the van body and does not in such position interfere with normal uses of the door of the van or in anyway project interiorally of the van body.

Figure 2:
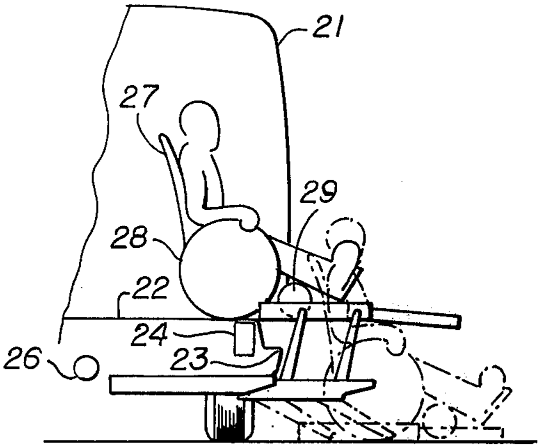
FIG. 2 shows the device in solid lines raised to the level of the floor of the van and in dotted lines lowered to ground level.
Figure 3:
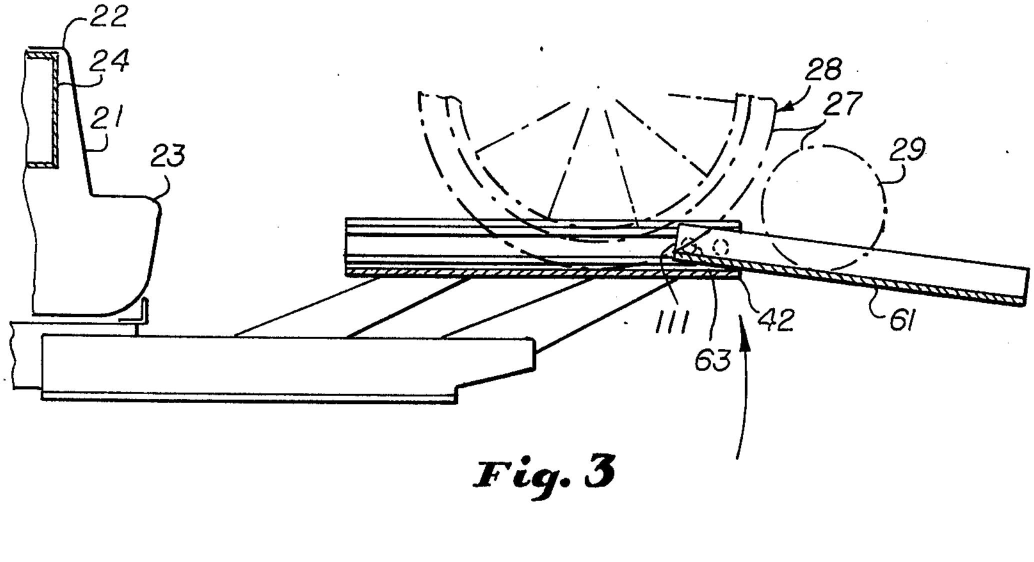
FIG. 3 is an enlarged view of the mechanism intermediate projected storage position and fully raised position.

A conventional wheelchair 27 is illustrated schematically in FIGS. 2 and 3. Such a chair has large wheels 28 and smaller wheels 29. In normal usage, the device lowers to ground level and the user wheels the chair onto the pans of the device to assume the dot-and-dash position of FIG. 2. Thereupon, the mechanism is lifted upwardly, an intermediate position being shown in FIG. 3; and finally, it is completely lifted to the solid line position of FIG. 2 for the chair 27 to be moved onto the floor 22. To lower the chair 27 the reverse operation is performed. In FIG. 1 the mechanism is projected directly out from storage position, a position which is the first position beyond storage position.

Figure 4:
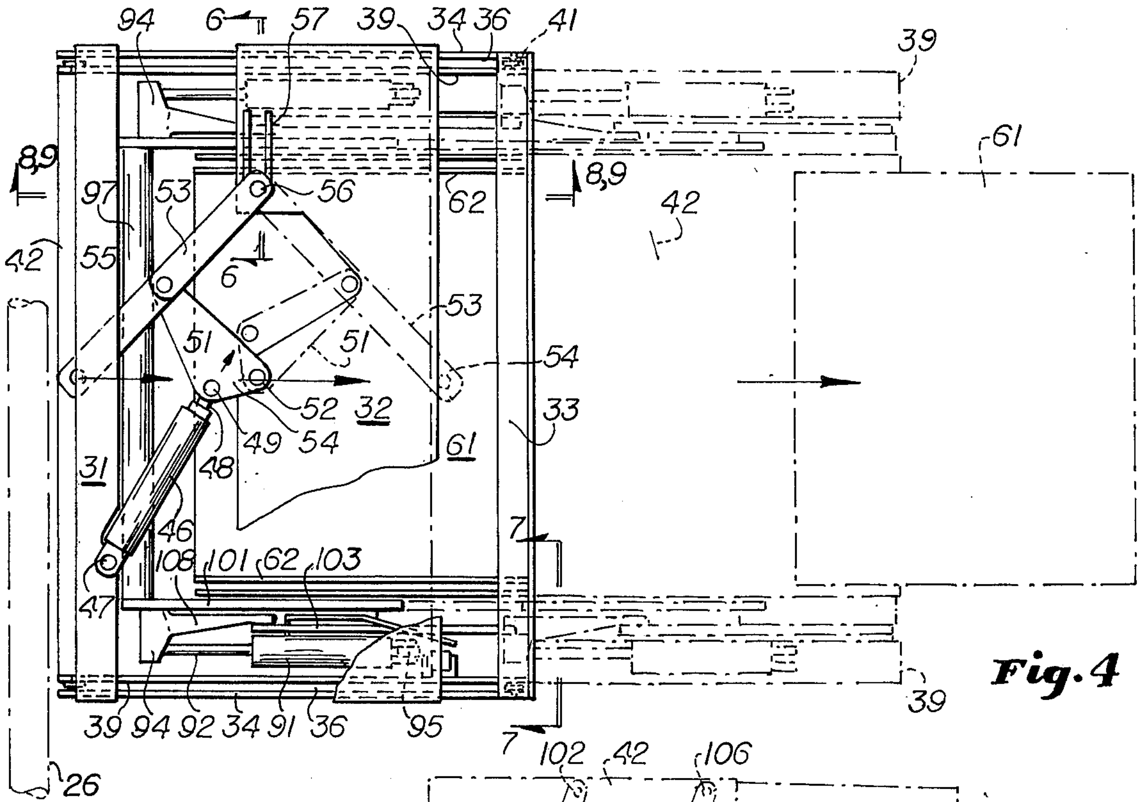
FIG. 4 is a plan view showing the mechanism in storage position in solid lines and in projected position in dot-and-dash lines.
Figure 5:
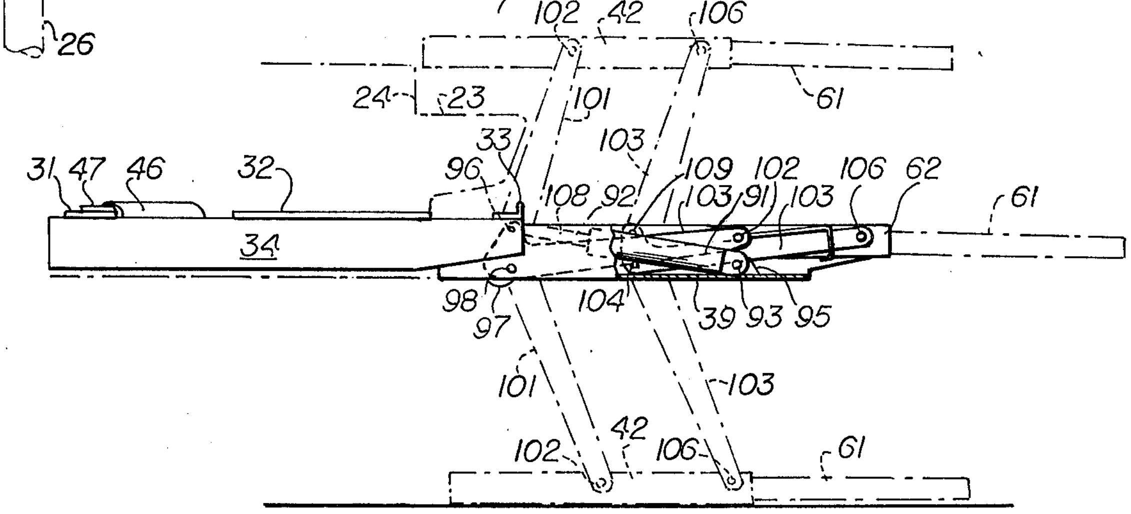
FIG. 5 is a side elevational view of the structure of FIG. 4.

As best shown in FIGS. 4 and 5, the device on its upper surface has three transverse stationary members 31, 32 and 33 which are fixed by bolting or other means to the underside of the frame 24 of the van. The term "transverse" is used in this sense to relate to projection and retraction of the device and is, therefore, not to be confused with the terms "longitudinal" and "transverse" relative to the vehicle 21.

On either side of the lift there are vertical longitudinal stationary members 34 which are fixed to members 31, 32 and 33 to form a rigid frame. The outermost stationary member 33 is an angle bar which is immediately below the outermost projection of the ledge 23. On the inside surface of each longitudinal member 34 are stationary tracks 36, as best shown in FIG. 6.

Figure 7:
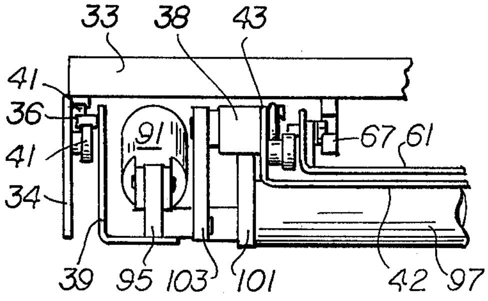
FIG. 7 is a fragmentary sectional view taken substantially along the line 7—7 of FIG. 4.
Figure 6:
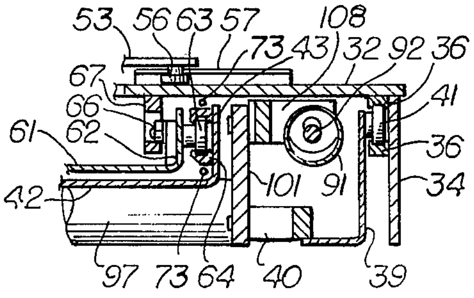
FIG. 6 is a fragmentary sectional view taken substantially along the line 6—6 of FIG. 4.
Figure 8:
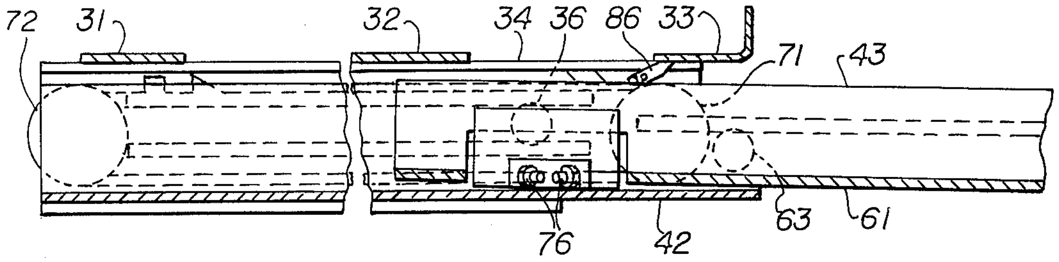
FIG. 8 is a sectional view taken substantially along the line 8—8 of FIG. 4 in an enlarged scale and partly broken away to conserve space, showing the inner platform extended relative to outer platform.

Longitudinally slideable in tracks 36 is lower platform generally U-shaped frame 39 which is of a complicated shape and is shown in FIGS. 5, 6 and 7 as being a vertically disposed angle 40 having a vertical flange connected to arms 101 and 103 by means of brackets 40. The upper end of flange 39 carries rollers on either side of the device which slide between track members 36. By means hereinafter explained in detail, the lower platform 42, with longitudinally extending vertical flanges 43 on either side, is supported by pivot block 38.

Cylinder 46 causes the frame 39 to project and retract relative to the frame 34. One end of cylinder 46 is pivoted by pivot 47 to stationary transverse member 31. The rod 48 of cylinder 46 is connected by pivot 49 to bell crank lever 51 (see especially FIG. 4). One corner of lever 51 is connected by pivot 52 to intermediate stationary member 32. A third corner of bell crank 51 is connected by pivot 55 to the midpoint of elongated link 53. The one end of link 53 is pivoted by pivot 54 to the inner end of U-shaped frame 39. The opposite end of link 53 turns a roller 56 which slides in track 57 fixed to stationary member 32.

The movement of U-shaped frame 39 caused by actuation of cylinder 46 is best illustrated in FIGS. 4 and 5. The solid line position of FIG. 4 shows the frame 39 in retracted position, and in this position the rod 48 of cylinder 46 is retracted. By controls not shown, when it is desired to project the lift, the cylinder 46 is energized, causing the rod 48 to move outwardly. This causes the bell crank 51 to pivot around pivot 52 which is attached to stationary plate 32. The link 53 then swings from the solid line position of FIG. 4 to the dot-and-dash position, the roller 56 sliding outwardly in track 57 to permit such swinging movement. Thereupon, the pivot 54 moves in a straight line to the dot-and-dash position shown in FIG. 4 and the frame 39 reaches the dot-and-dash position shown in FIG. 4. Such position is the solid line position of FIG. 5. The linkage which has been described permits a relatively short stroke of cylinder 46 to accomplish a movement of the frame 39 of considerable amplitude. The drive shaft 26 is shown in FIG. 4, and it will be seen that the entire mechanism in storage position is disposed entirely to one side of this drive shaft and hence no major modification of the van is required.

Slideable inwardly and outwardly relative to lower pan 42 is upper pan 61 which is slightly smaller than the lower pan. Pan 42 has upward bent vertical longitudinal flanges 43 on either side of the apparatus and affixed thereto are longitudinal tracks 64. Upper pan 61 also has a longitudinal vertical flange 62 on each side and flange 62 carries a roller 63 which slides in tracks 64. The spindle of each roller 63 carries a nut 66 which fits into the opening of apertured lug 67 which depends from stationary plate 32. The aperture in lug 67 not only permits installation and removal of nut 66 but also provides a brake against movement of pan 61 relative to pan 42 so that the apparatus may not extend from the storage position unintentionally.

Projection and retraction of pan 61 relative to pan 42 is accomplished by a cable drive which causes the pan 61 to project relative to longitudinal stationary member 34 at twice the rate of projection of pan 42. As best shown in FIGS. 8–11, on each side of the apparatus there is an outer pulley 71 and an inner pulley 72 fixed for rotation on flange 43 of lower pan 42. Cable 73 passes around both pulleys 71 and 72. A fitting 74 performs the function of connecting the ends of cable 73 and also attaching the cable to upper platform or pan 61. Thus there is an opening 77 in the pan 42 for a wrench to tighten the nuts 76 which hold the opposite ends of cable 73 to fitting 74.

Figure 9:
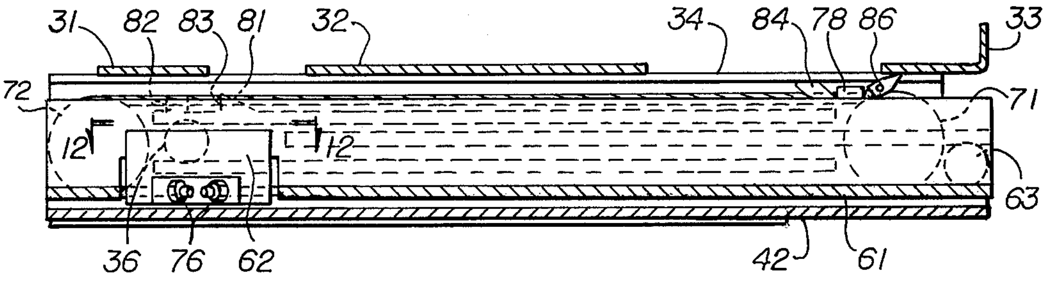
FIG. 9 is a sectional view taken substantially along the line 9—9 of FIG. 4.
Figure 10:
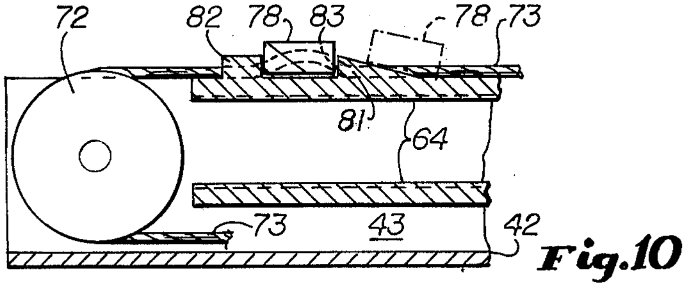
FIG. 10 is an enlarged sectional view of a portion of the structure of the platforms with parts removed to reveal internal construction, showing platforms locked together in the fully extended position.
Figure 12:
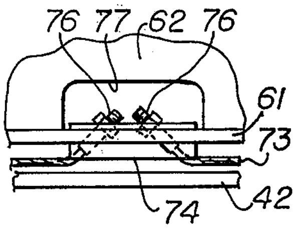
FIG. 12 is a fragmentary view showing in plan attachment of the cable to the lower pan.

A block 78 is fixed to cable 73 on the upper stretch thereof and is so located that it may move between the inward position shown in FIG. 10 and outward position shown in FIG. 9, and as the block 78 moves, it causes the pan 61 to move relative to the pan 42 at twice the velocity. At the inboard end of upper track 64 which is carried by flange 43 there is a stop 82 and outwardly of stop 82 upper track 64 carries a ramp 81; and accordingly, there is a notch 83 in the upper surface of upper track 64 between the inner end of ramp 81 and the outer end of stop 82 which is of a length slightly greater than the length of block 78 on cable 73. Thus the block 78 as it moves rearwardly reaches the dot-and-dash position of FIG. 10 and then falls into the notch 83 because of the tension of cable 73. When the block 78 is in the notch 83, the cable 73 is fixed relative to pan 42 and there can be no movement of pan 61 relative thereto.

Figure 11:
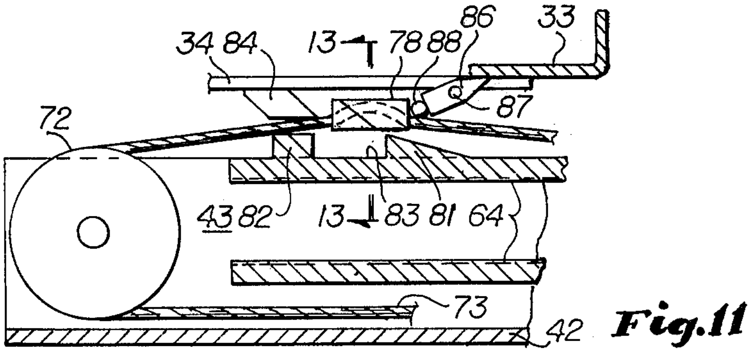
FIG. 11 is a view similar to FIG. 10 showing the parts in a different position in the cycle of operation.
Figure 13:
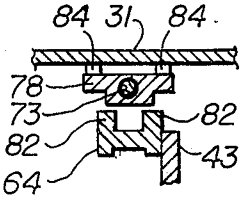
FIG. 13 is a fragmentary sectional view taken substantially along the line 13—13 of FIG. 11.

Directing attention now to FIGS. 11 and 13, dog 86 and 88 is pivoted by pivot 87 to stationary member 34 adjacent its outer end. The weight of dog 86 and 88 normally causes it to hang in the position of FIG. 11 where it obstructs movement of block 78. Fingers 84 depend from frame member 34 and curve under block 78, as best shown in FIG. 13. Because of the slanting position of fingers 84, they tend to raise the block 78 out of the notch 83. The block 78 is fixed against movement when in the elevated position shown in FIG. 11. Hence the cable 73 is held stationary, and as the pan 42 is projected outwardly by actuation of cylinder 46, as has already been explained, the cable 73 remains stationary and thus the pan 61 is caused to move outward relative to pan 42 at twice the speed of the latter.

On either side of the device is a cylinder 91 which causes raising and lowering of pivot block 38; and accordingly, raising and lowering of pans 42 and 61. The end of cylinder 91 opposite its rod 92 is connected by pivot 93 to ear 95 fixed to member 39. Rod 92 is connected by pivot 96 to inner arm 101. For rigidifying the structure and causing both sides of the device to raise and lower together there is a transverse torque tube 97 extending between opposed sides of U-shaped frame 39 and pivoted thereto by pivot 98. Rod 92, as has been explained, is pivoted at point 96, which causes arms 101 to pivot in unison about pivots 98.

On each side of the machine there is a second or outer arm 103 which is at all times parallel to arm 101. Arm 103 is pivoted by pivot 104 to U-shaped frame 39 and the arm 103 has an upward extension and pivot 109. The upward pivots 96 and 109 are interconnected by a longitudinal link 108 which is attached to pivots 96 and 109. Thus as the rod 92 of cylinder 91 extends, it causes the arms 101 and 103 to pivot about their pivot points 98 and 104, respectively, and the outer ends of arms 101 and 103 being pivoted by means of pivots 102 and 106, respectively, at pivot block 38, attached to the flange 43 of pan 42, the pan 42 swings between the lowermost position of FIG. 5 and the uppermost position. The torque tube 97 insures that the arms 101 and 103 on opposite sides swing together.

One feature of the construction heretofore described is best shown in FIG. 3. It will be seen that the pan 61 may by gravity hang down relative to the pan 42 since the roller 63 permits such angular position. Thus the inner end of pan 61 provides a stop 111. The big wheel 28 of the wheelchair is prevented by stop 111 from moving outwardly unintentionally. (See FIG. 3)

Per FIG. 4, as shown in the solid line position, the pans 61 and 42 are retracted and the lower platform U-shaped frame 39 is likewise retracted. In this position, the entire mechanism is stored within the normal contour of the van 21 below the frame 24. (See FIG. 1). To load a wheelchair 27 into the van 21, the door (not shown) of the van is opened. This provides access to a control box 112 (FIG. 1). This control box is accessible to the occupant of the wheelchair either from the interior of the van or from the ground level. There is a hydraulic pump to supply fluid for the double acting cylinders 46, 91, and also valve controls (not shown), all of which are controlled from the box 112. The details of the electrical and hydraulic systems are not herein illustrated, it being believed that they are well within the skill of one who would work in this art and are likewise subject to considerable variation. With the pump (not shown) operating, the valves (not shown) which supply fluid to the cylinder 46 cause the rod 48 to project and this swings the bell crank 51 from the solid line position of FIG. 4 to the dotted line position and causes pan 42 and frame member 39 to slide outwardly, the rollers 41 sliding in the tracks 36. As the pan 42 projects horizontally outwardly toward the position of FIG. 1, the dog 88 pivoting at a stationary portion of the frame 34 engages the block 78 and holds it stationary while the pulleys 71, 72 move with the pan 42. Thus the upper run of the cables 73 on each side of the machine remain stationary, and since their lower runs are fixed to pan 61 there is a relative sliding of pan 61 relative to pan 42 as the pan 42 moves outwardly. This results in outward projection of the pan 61 to the solid line position of FIG. 1. When the member 42 is fully out it approaches the position shown in FIG. 11, and thereafter the block 78 drops into the notch 82, as shown in FIG. 10. In such position the block 78 will clear the dog 88; or in other words, thereafter the pans 42 and 61 move outwardly together to achieve the position shown in FIG. 1. A limit switch (not shown) stops further energization of the cylinder 46 when the pans are fully extended. The control in box 112 may be used at any time to terminate extension if full extension is not required.

The next step is to lower the pans 42, 61 to curb or ground level for loading the wheelchair 27. The user or an attendant energizes valves controlling the cylinder 91 by appropriate switches in the control box 112. This causes the pans to be depressed to the bottom dotted line position of FIG. 2 and FIG. 5. Cylinder 91 in the neutral position of FIG. 1 is so positioned that the rod 92 is partway out. To lower the pans to the bottom dotted line position of FIG. 5, the rod 92 is retracted within the cylinder 91. Such retraction causes the pivot 96 to move clockwise about the pivot point 98 and in turn causes the arm 101 to swing clockwise downwardly. By reason of the link 108 connecting the extensions 96 and 109, the arm 103 also swings downwardly about pivot point 104. The torque tube 97 insures that the arms 101, 103 on each side swing simultaneously and equidistantly. With the pans 42, 61 full down, the wheelchair may be pushed into the dotted line position of FIG. 2.

To raise the wheelchair to the full line position of FIG. 2, the operator or user again energizes the cylinder 91 to fully project the rod 92 and this causes the arms 101, 103 to swing in a counter-clockwise direction as viewed in FIG. 5 to the dot-and-dash upward position. The wheelchair is then pushed into the van on the floor 22. A safety feature, as shown in FIG. 3, prevents the wheelchair from rolling off the pan 42 while it is being lifted to full up position. There is a slight gap where roller 63 contacts rails 64 on each side of the apparatus, and hence by reason of gravity the pan 61 may slant slightly downwardly as shown in FIG. 3 causing a stop 111 to occur which prevents the wheel 28 from rolling off.

After the wheelchair is loaded into the van, the controls in box 112 are activated to lower the pans 42, 61 to the full line position of FIG. 1 and then to retract to fully retracted position of FIGS. 4 and 9.

What is claimed is:

1. A lift installed on a vehicle having a floor and vertical walls for a wheelchair or the like capable of lifting the wheelchair from a lower level to an upper level at said floor, comprising stationary frame means fixed to said vehicle below said floor and within the projection of said walls, a pair of opposed longitudinal track forming members on said stationary frame means, a pair of longitudinally slideable frame members horizontally slideable in said track forming members between an inner position within said vertical walls and an outer position, first actuating means for sliding said slideable frame members, each said slideable frame member having a longitudinal pivot block, a horizontal platform, a first and a second vertically extending link on each side of said lift, each said link pivoted at one end to said horizontal platform and at an opposite end to said pivot block, means for causing all of said links to pivot equiangularly, and second actuating means for pivoting said links to move said platform from a first position directly outward of said stationary frame means either to said lower level or to said upper level, whereby a wheelchair may be lifted on said platform from said lower level to said upper level or the reverse, said second actuating means comprising a pair of fluid cylinders disposed substantially horizontally and parallel to said slidable frame members, one said cylinder being on each side of said platform, one end of said cylinder being pivoted to said slidable frame member and the opposite end of said cylinder being connected to one said link to cause said link to pivot relation to said slidable frame member, said cylinders being located inward of said stationary frame means, said longitudinal track forming members being below the floor of the vehicle and of a length that said lift is retractable entirely within the vertical projection of said walls of said vehicle.

2. A lift according to claim 1 which further comprises a second platform parallel and in juxtaposition to said first-mentioned platform and second platform drive means interconnecting said platforms for inward and outward movement together.

3. A lift according to claim 1 which further comprises a single transverse horizontal torque tube fixed to the inner ends of said pivot blocks to cause said links on opposite sides of said lift to pivot together.

4. A lift according to claim 1 which further comprises horizontal second track forming members on said first mentioned platform, a second platform having slightly smaller dimensions than said first mentioned platform when viewed in top plan and slidable means on said second platform engageable with said second track forming members, said second track forming means being dimensioned so that said second platform may slide horizontally from an inward position within the outline of said first mentioned platform and extended position extending outward of said first mentioned platform.

5. A lift according to claim 4 which further comprises second platform drive means to move said second platform between inward and extended positions comprising, an inner and outer pulley fixed to said first mentioned platform, a cable running around said pulleys, first cable means fixing said cable to said second platform, second cable means on said cable, a stop on the inner end of said second track forming means, a ramp outward of said stop, said second cable means fitting between said stop and said ramp, a dog pivoted to the outer end of said stationary frame means, means biasing said dog to a position to engage said second cable means to raise said second cable means over said stop.

6. A lift installed on a vehicle having a floor and vertical walls for a wheelchair or the like capable of lifting the wheelchair from a lower level to an upper level at said floor, comprising stationary frame means fixed to said vehicle below said floor and within the projection of said walls, a pair of opposed longitudinal track forming members on said stationary frame means, a pair of longitudinally slidable frame members horizontally slidable in said track forming members between an inner position within said vertical walls and an outer position, first actuating means for sliding said slidable frame members, each said slidable frame member having a longitudinal pivot block, a horizontal platform, a first and a second vertically extending link on each side of said lift, each said link pivoted at one end to said horizontal platform and at an opposite end to said pivot block, means for causing all of said links to pivot equiangularly, and second actuating means for pivoting said links to move said platform from a first position directly outward of said stationary frame means either to said lower level or to said upper level, whereby a wheelchair may be lifted on said platform from said lower level to said upper level or the reverse, said first actuating means comprising a fluid cylinder pivoted to said stationary frame means and having a rod, a bell crank pivoted to said stationary frame means outward of said cylinder and to said rod, a horizontal link pivoted at one end to the inner edge of said platform and at its midpoint to said bell crank, a transverse track on said stationary frame means and a roller on the end of said horizontal link opposite said inner edge of said platform horizontally slidable in said transverse track.

* * * * *